Patented Feb. 7, 1933

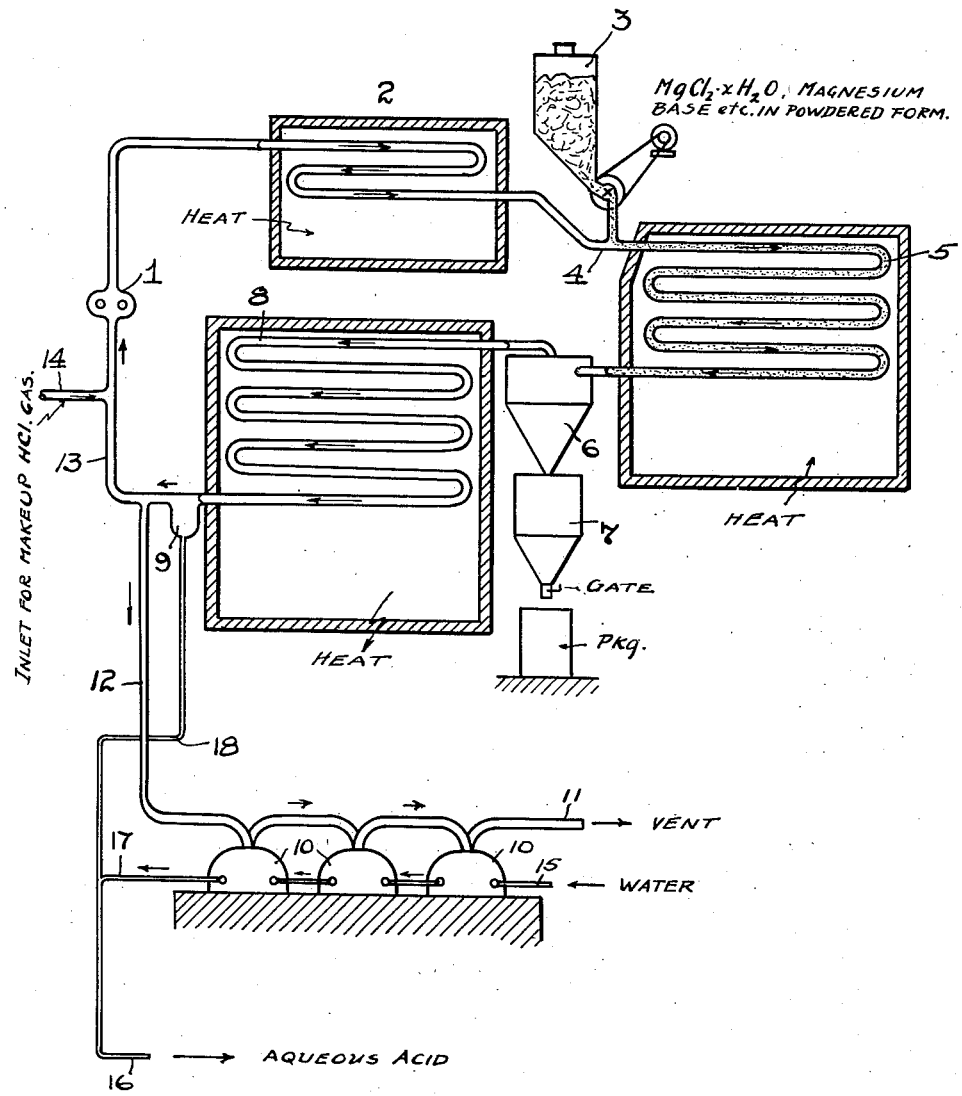

1,896,406

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

POWDERED ANHYDROUS MAGNESIUM CHLORIDE AND METHOD OF MAKING SAME

Application filed April 5, 1929. Serial No. 352,710.

The invention herein relates, as indicated, to the preparation of anhydrous magnesium chloride, specifically, a powdered form thereof and may be regarded as an improvement upon methods heretofore proposed for the preparation of the anhydrous chloride by drying in a current of hydrochloric acid gas.

Methods have been proposed for the dehydration of hydrated magnesium chloride in a current of HCl gas and for the preparation of magnesium chloride by the reaction of dry HCl gas on MgO, magnesium oxychloride or other magnesium compound reactable with HCl to form $MgCl_2$ and water. Such methods have proposed treating a mass or moving current of divided solid hydrated magnesium chloride of MgO or other magnesium compound with a current of HCl gas. Granulated or flaked forms of the magnesium compound have been proposed. The solid material although agitated or stirred in some instances and even sometimes momentarily showered through the gas current, has been in all such proposals a current or mass of solid particles contacting with a separate current of gas and suspension of any particles of solid in the gas current has been avoided. I propose to contact the solid material with a current of hot hydrochloric acid gas while maintaining the particles in suspension therein.

Heretofore, in the dehydration of magnesium chloride by heat in the presence of an atmosphere containing hydrochloric acid gas at elevated temperature, the magnesium chloride has been supplied, as stated above, in a granular, flaked, or other convenient divided form, and although dehydration of the outer surfaces of the particles has been effected within a reasonable time, the final dehydration to the core of the particles has taken considerable length of time even under the best conditions, it being obvious that the water vapor liberated from the interior must be diffused out of the particles and that the products of decomposition formed therein during the drying, must be reacted upon by the hydrochloric acid diffusing into the particles before such products can be converted to the anhydrous chloride.

In my improved process, I prepare the hydrated magnesium chloride, or other magnesium compound reactable with hydrochloric acid to form magnesium chloride, in the form of a fine powder, preferably one passing a standard 60 mesh screen, and I dehydrate said particles of hydrated chloride, or react said other material at an elevated temperature while suspended in a gaseous current containing hydrochloric acid gas. Dehydration, under such conditions, is very rapid and substantially complete, and an exceptionally fine product may be obtained by separating the dried powder from the hot hydrochloric acid gas current.

To the accomplishment of the foregoing and related ends, the invention, then, consists of the methods, steps and product hereinafter fully described and particularly pointed out in the claims, the annexed drawing and the following description setting forth in detail several modes of carrying out the invention, such disclosed modes illustrating, however, but several of the various ways in which the principle of the invention may be used.

In said annexed drawing:—

The single figure accompanying represents in a diagrammatic way a set-up of apparatus adapted to carry out my improved process and to produce my improved product, the legends thereon setting forth clearly the character of the individual pieces of connected equipment.

Referring now to the drawing, 1 represents a gas circulating pump adapted to circulate the current of hydrochloric acid-containing-gas through the system. 2 is a gas preheater adapted to raise the temperature of the gas current to a temperature at which satisfactory drying and reaction may be effected in the succeeding step. 3 is a bin or equivalent means to supply powdered magnesium chloride or other magnesium compound employed. Such powdered material may be $MgCl_2.1H_2O$ or may contain a different or varying amount of water and may even be comprised of or contain magnesium oxide, hydroxide, or magnesium oxychloride, since those compounds will be converted to anhydrous magnesium chloride in the succeeding step. A continuous feeder at the base of the hopper feeds a regulated stream of such powdered material into the gas stream at 4. The gas stream picks up the powder and carries it in suspension through the tubes of the dryer 5 in which the temperature is maintained by introducing heat to the degree necessary for effecting drying of the hydrated salt fed or formed by the reaction. The hot gas stream carrying the suspended anhydrous chloride, which has been converted thereto from the hydrated feed or derived from other material fed to dryer, then enters the centrifugal separator 6 in which the suspended powder is thrown down and collected in the receiver 7, from which it may be withdrawn and packaged or otherwise disposed of. The so stripped, hot gas stream is then led into the gas cooler 8 where it is chilled and aqueous hydrochloric acid precipitated carrying with it substantially all of the water content thereof. Such aqueous acid is then caught in the acid trap 9 and is drawn off therefrom by pipes 18 and 16, as aqueous acid. The now dehumidified gas leaving the trap is returned by pipe 13 to the gas circulating pump 1. In order to eliminate accumulating inert diluents a controlled portion of the gas stream is vented by way of pipe 12 to a set of tourills, or other suitable absorber, in which the so vented acid gas is absorbed in water to produce aqueous acid, the water entering by pipe 15 and emerging as acid by pipe 17 to join with pipe 18 in pipe 16 in which the aqueous acid is delivered. The residual uncondensed gases are vented from the system at 11. Suitable dampers, or control devices, may be inserted in the pipes 12 or 11, or at other suitable places, to control the amount of gas vented. Substantially dry make-up hydrochloric acid gas is admitted at 14 where it joins the dehumidified gas stream from the cooler on its way to the gas circulating pump.

The operation of the system is continuous, the rate of introduction of the powdered material being controlled so that it will all be carried in suspension in the gas stream, the cross section of the conduit for said gas being chosen of a size relative to the rate of working so that the velocity of the gas stream is sufficient to maintain the powder in suspension as is well known in Airveyor systems. In such systems it is customary to use at least 4 cu. ft. of gas per pound of powder, and I find that when dehydrating $MgCl_2.1H_2O$, considerably more gas is required than 4 cu. ft. per pound of material so that the limiting conditions of continuous suspension are automatically exceeded. The precise nature or construction of the gas preheater, the dryer, the separator, the cooler and other connected equipment, should be such as to enable continuous operation under the acid conditions. An iron tubular heater may be used for the gas preheater and iron may also be used in the dryer, separator and bin, and a portion of the cooler where the temperature of the gas is still above the dew point may be of iron but that portion in which the aqueous acid precipitates out should be of acid-proof material, such as stoneware, glass, etc. Such material is also required for the trap, the tourill system and the pipes for the aqueous acid. The inlet pipe for the cool dry gas to the circulating pump may also be of iron.

The reactions involved may be written thus:—

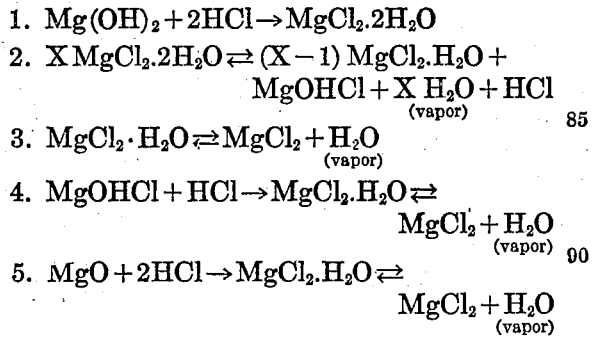

In order that $MgCl_2.H_2O$ shall be dehydrated and produce the anhydrous salt, and further that $MgO$, $Mg(OH)_2$, $MgOHCl$, or other oxychloride or magnesium base shall react to produce water vapor and the anhydrous chloride, the temperature must be high enough to decompose the hydrated chloride fed, or formed by the reaction, and the molecular ratio $HCl/H_2O$ in the atmosphere must be in excess of the equilibrium ratio for the hydrated salt at the temperature used.

I find that equilibrium is established in the dryer when the gas therein contains 17 per cent. $H_2O$ relative to 83 per cent. $HCl$ (gravimetric) but in order to provide a sufficient drying head, I prefer that the $H_2O$ concentration in the dryer gas shall not exceed approximately 12 per cent. relative to 88 per cent. $HCl$. Air acts to slow up diffusion of $HCl$ and $H_2O$ vapor in and out of the solids, hence the absence of inert gas is preferred. I find that if sufficient gas be used relative to the drying requirements so that when it issues from the dryer with the anhydrous salt in suspension, it is about 60 per cent. saturated with respect to the equilibrium point and at approximately 300° C., a satisfactory rate of working will be effected, and also, a satisfactory reacted, dried or dehydrated product will be obtained.

Other forms of apparatus suited to the process may be employed, change being made in same as desired, e. g., the water may be removed from the gas by other means than by chilling, e. g., absorption in strong $H_2SO_4$, etc.; the separator may be of other than the centrifugal type; heating may be done electrically or by fuel; vented gas may be absorbed or otherwise used, etc. without departing from the spirit of my invention.

The object of venting a portion of the gaseous current is to maintain in the dryer a sufficiently high content of hydrochloric acid gas, by removing with the vented gas, excess diluent from whatever source derived.

Such vented gas may be used as such where a use is available or it may be absorbed in water, as herein disclosed, to produce aqueous acid and any suitable form to absorber may be used.

Venting may be done at any point in the gas circuit after the chloride separating step and preferably before the point at which make-up gas is introduced, but if the vented gas is to be absorbed in water, the vent gases will be preferably taken off after the cooler.

Other methods of removing water than by cooling, as indicated above, may be substituted, but where cooling is used the degree of cooling for the purpose of removing water as aqueous acid may be confined within economic limits, having due regard to the cost of cooling and reheating as also the permissible water content in the dehydrated gas. Cooling to 40° C. is permissible, at which temperature the bulk of the water will have been removed from a gas current of 70 per cent, hydrochloric acid gas strength. Lower cooling will remove more water but will involve increased cooling and reheating costs.

The temperature of the preheated gas current will preferably be in the neighborhood of 300° C. and that approximate temperature will also be maintained in the drying step.

The thermal efficiency attained will vary with the working temperature range and the ratio of gaseous current volume to product dried, but I prefer to maintain the temperature of drying at or about 300° C., as stated, and the cooled temperature of the gas stream at or about 40° C., with the water content of the wet gas leaving the dryer at about 12 per cent, relative to 88 per cent. HCl in a gas stream containing 70 per cent. total HCl taken at a point after the cooler. Such a gas strength may be realized by using a make-up testing 85 per cent. HCl.

I conceive my improved method as applicable to the production of anhydrous magnesium chloride in powdered form from a powdered form of the hydrated chloride which may contain magnesium oxide or magnesium oxychloride, or from a like form of a suitable magnesium base. The method is particularly applicable to the production of the anhydrous form of magnesium chloride from a powdered form of air dried hydrated chloride in which the monohydrate form is the highest hydrated form present which may also contain decomposition products formed by previous air-drying of the hydrated salt, such as MgOHCl, or from a like form of any solid magnesium-containing substance which will react with the hydrochloric acid to form $MgCl_2$ and water. Such latter include magnesium oxide, oxychloride or hydroxide, preferably dried before use.

Other modes of applying the principle of my invention may be employed instead of the one explained, change being made as regards the process herein disclosed, provided the step or steps stated by any of the following claims, or the equivalent of such stated step or steps, be employed.

I therefore particularly point out and distinctly claim as my invention:—

1. The method of making powdered anhydrous magnesium chloride which comprises suspending a powdered magnesium compound, reactable with hydrochloric acid to form magnesium chloride, in a rapidly moving current of hydrochloric acid gas at a temperature sufficient to vaporize water from the magnesium chloride formed, maintaining the same in suspension until dehydration is substantially complete and separating the substantially anhydrous powdered product from the hot gaseous current.

2. The method of making powdered anhydrous magnesium chloride which comprises suspending a powdered magnesium compound, reactable with hydrochloric acid to form magnesium chloride, in a rapidly moving current of hydrochloric acid gas at a temperature sufficient to vaporize water from the magnesium chloride formed, maintaining the same in suspension until dehydration is substantially complete, separating the substantially anhydrous powdered product from the hot gaseous current, cooling the latter to condense water therefrom as a solution of hydrochloric acid and returning the dehumidified gas to the first step.

3. The method of making powdered anhydrous magnesium chloride which comprises suspending a powdered hydrated form of magnesium chloride in a rapidly moving current of hydrochloric acid gas at a temperature sufficient to vaporize water therefrom, maintaining the same in suspension until dehydration is substantially complete and separating the substantially anhydrous powdered product from the hot gaseous current.

4. The method of making powdered anhydrous magnesium chloride which comprises suspending air-dried magnesium chloride in powdered form in a rapidly moving current of hydrochloric acid gas at a temperature sufficient to vaporize water therefrom, maintaining the same in suspension until dehydration is substantially complete and separating the substantially anhydrous powdered product from the hot gaseous current.

5. The method of making powdered anhydrous magnesium chloride which comprises suspending air-dried magnesium chloride in powdered form in a rapidly moving current of hydrochloric acid gas at a temperature of approximately 300° C., maintaining the same in suspension until dehydration is substantially complete, separating the substantially anhydrous powdered product from the hot gaseous current, cooling the latter to a temperature of about 40° C. to condense water therefrom as a solution of hydrochloric acid and returning the dehumidified gas to the dehydrating step.

6. The method of dehydrating powdered magnesium chloride which comprises suspending a powdered hydrated form thereof in a current of hydrochloric acid gas heated to a temperature sufficient to vaporize water therefrom and separating the dehydrated product from the hot gaseous current.

7. The method of making a dehydrated powdered form of magnesium chloride which comprises suspending a powdered magnesium compound, reactable with hydrochloric acid to form magnesium chloride, in a current of hydrochloric acid gas heated to a temperature sufficient to vaporize water from the magnesium chloride formed and separating the powdered product from the hot gaseous current.

Signed by me this 2nd day of April, 1929.
SHELDON B. HEATH.